(12) United States Patent
Selak

(10) Patent No.: US 7,104,466 B2
(45) Date of Patent: Sep. 12, 2006

(54) INJECTION MOLDING NOZZLE WITH MOUNTING SLEEVE FOR TEMPERATURE SENSOR

(75) Inventor: Vincenc Selak, Rhinau (FR)

(73) Assignee: Otto Männer Innovations GmbH, Bahlingen (DE)

( * ) Notice: Subject to any disclaimer, the term of this patent is extended or adjusted under 35 U.S.C. 154(b) by 0 days.

(21) Appl. No.: 11/187,152

(22) Filed: Jul. 23, 2005

(65) Prior Publication Data

US 2005/0252987 A1   Nov. 17, 2005

(30) Foreign Application Priority Data

Aug. 5, 2004  (DE) .................... 10 2004 038 056

(51) Int. Cl.
*B05B 1/24*  (2006.01)
*B05B 1/00*  (2006.01)

(52) U.S. Cl. ...................... 239/135; 239/133; 239/128; 239/600; 425/549; 264/328.15

(58) Field of Classification Search ........ 239/128–139, 239/600; 425/549; 264/328.15
See application file for complete search history.

(56) References Cited

U.S. PATENT DOCUMENTS

| 4,941,249 | A | * | 7/1990 | Gellert | ..................... | 29/611 |
| 5,046,942 | A | * | 9/1991 | Gellert | ..................... | 425/549 |
| 5,895,669 | A | * | 4/1999 | Seres et al. | ............... | 425/549 |
| 6,163,016 | A | * | 12/2000 | Johnson et al. | .......... | 219/424 |

* cited by examiner

*Primary Examiner*—Dingh Q. Nguyen
(74) *Attorney, Agent, or Firm*—Klaus J. Bach

(57) ABSTRACT

In an injection molding nozzle comprising a nozzle body including a passage with a nozzle opening, a thermoelement disposed in the nozzle body and a clamping sleeve disposed on the nozzle body and having an internal cavity with an access opening through which the thermoelement extends into the cavity, the cavity has a radially outer wall which is inclined so that by movement of the clamping sleeve relative to the thermoelement the thermoelement is firmly engaged with the nozzle body so as to establish a good heat transfer contact between the nozzle body and the thermoelement.

10 Claims, 4 Drawing Sheets

INJECTION MOLDING NOZZLE WITH MOUNTING SLEEVE FOR TEMPERATURE SENSOR

BACKGROUND OF THE INVENTION

The invention relates to an injection molding nozzle having a nozzle body with a flow passage with a nozzle opening and a mounting sleeve for a temperature sensor.

Such an injection molding nozzle, also called a "hot channel nozzle", is well-known in the art and has been manufactured and sold by the Applicant for some time.

In the known injection molding nozzle, a temperature sensor which is provided for measuring the nozzle temperature in the area of the nozzle opening, is inserted into a cavity extending in the area of the nozzle opening into the interior of the nozzle body.

The temperature sensor is generally arranged in a small tube through which also the connecting wires for the temperature sensor extend. Since a heating coil extends around the nozzle body, the temperature sensor or, respectively, the tube in which the temperature sensor is disposed and through which the connecting wires extend must not project from the nozzle body. Therefore, starting at the cavity, the nozzle body is provided with an axially extending groove in which the tube including the wires leading to the temperature sensor are accommodated.

Since the cavity extends into the interior of the nozzle body but the groove extends in axial direction of the nozzle body, the front end of the tube with the temperature sensor needs to be bent over. Since the temperature sensor should be in good contact with the nozzle body to provide for a good heat exchange therebetween, the bending angle and bending procedure must be very precise which requires an expensive procedure.

Furthermore, an unevenness of the heating coil disadvantageously affects the force with which the temperature sensor is biased in contact with the bottom wall of the cavity. Also, this force is not always the same which result in different heat transfer resistances between the temperature sensor and the nozzle body in different injection molding nozzles.

Different heat transfer resistances between the temperature sensors and the nozzle bodies result in measuring inaccuracies which is disadvantageous since, as a result, the temperature of a nozzle body as measured by the temperature sensor in areas of the nozzle opening does not provide the same value for every nozzle. This is particularly disadvantageous if an injection mold includes several injection nozzles since different temperatures result in different viscosities of the plastic material being injected. This results in a different constitution of different areas of the product being manufactured and consequently in a loss in a quality of the product.

It is the object of the present invention to provide an injection molding nozzle with a temperature sensor arranged in the area of the nozzle opening wherein the temperature sensor is disposed reliably in good heat transfer contact with the nozzle body in a simple manner.

SUMMARY OF THE INVENTION

In an injection molding nozzle comprising a nozzle body including a passage with a nozzle opening, a thermoelement disposed in the nozzle body and a clamping sleeve disposed on the nozzle body and having an internal cavity with an access opening through which the thermoelement extends into the cavity, the cavity has a radially outer wall which is inclined so that by movement of the clamping sleeve relative to the thermoelement the thermoelement is firmly engaged with the nozzle body so as to establish a good heat transfer contact between the nozzle body and the thermoelement.

Since the cavity is formed on the inside of the clamping sleeve, the cavity forms with the nozzle body a space in which the temperature sensor can be arranged with direct contact to the nozzle body. Since the cavity is accessible by an access opening from without, the temperature sensor or thermoelement which may also be a heating element can be inserted into the cavity in a simple manner.

The temperature sensor or thermoelement and the cavity can be so designed that the temperature sensor is in contact with the nozzle body with a predetermined contact pressure when installed in the cavity.

An arrangement has been found to be advantageous wherein the clamping sleeve is rotatably disposed on the nozzle body. In this way, the temperature sensor can be arranged in the cavity in a simple manner. It only needs to be inserted through the access opening whereupon the clamping sleeve is rotated so that the temperature element is then disposed in the cavity formed by the clamping sleeve and the nozzle body.

In a particular embodiment of the invention, the cavity and the access groove thereto extend in axial direction of the clamping sleeve up to the rear end of the clamping sleeve. This has the advantage that a temperature sensor or temperature sensors which may be thermoelements which are longer than the clamping sleeve can be properly arranged in the cavity formed by the clamping sleeve and the nozzle body. Particularly, a temperature sensor which has been arranged in the conventional way disposed in a tube can be disposed in the cavity formed between the nozzle body and the sleeve. Advantageously, the end of the tube however no longer needs to be bent over.

It is particularly advantageous if the height of the cavity becomes smaller in the circumferential direction of the sleeve. In this way, the thermoelement can be firmly engaged between the wall of the cavity and the nozzle body when the clamping sleeve is rotated. It is then ensured that the thermoelement is in firm contact with the nozzle body providing for a low heat transfer resistance.

It is very advantageous if, in this embodiment, the reduction of the height of the cavity follows a certain curve so selected that, on one hand, the thermoelement is firmly engaged and, on the other hand, the wall of the thermoelement is in contact with the wall of the cavity over a relatively large contact area. If this curvature corresponds, for example at the side of the cavity opposite the opening, to the surface curvature of the thermoelement, the thermoelement is in contact with the clamping sleeve over a quarter of its circumference.

Instead of providing an opening and the access extending in the axial direction of the clamping sleeve, the cavity and the access may extend circumferentially as it is provided in another embodiment of the invention. Then the thermoelement can be engaged by an axial displacement of the clamping sleeve. In that case, the clamping sleeve does not need to be rotatable relative to the nozzle body but may be rotationally fixed.

This is particularly advantageous if a heating coil is disposed on the clamping sleeve. Since the heating coil is tightly disposed on the clamping sleeve in order to provide for a good heat transfer contact, it is generally loosened by rotation for its removal. This however may result in rotation of the clamping sleeve and a release of the thermoelement from the cavity in which it is disposed.

In the last mentioned embodiment, it is advantageous if the clamping sleeve has an axial slot at the end of which the cavity is disposed. In this way, the thermoelement can easily be inserted into the cavity. It only needs to be angled at its end so that the angled end of the thermoelement can be paced into the groove and the access whereupon the angled end at the thermoelement can be introduced into the cavity by axially moving the thermoelement into the slot.

In another particular embodiment of the invention, a heat conduction sleeve is firmly mounted onto the nozzle body. With the heat conduction sleeve disposed thereon the nozzle body does not need to have a stepped cylindrical shape. If the heat conduction sleeve has the same internal diameter and outer diameter as the clamping sleeve, the nozzle body may be straight cylindrical wherein the outer diameter of the structure consisting of the nozzle body and clamping sleeve projecting from the nozzle body does not change.

Advantageously, the heat conduction sleeve includes an axially extending slot. The axially extending slot can accommodate the thermoelement connecting wires or a part of the tube extending over the length of the clamping sleeve. The heat conducting sleeve is so designed that it is in firm engagement with the nozzle body.

Preferably, the heat conduction sleeve and/or the clamping sleeve consist of a material with a high heat transfer capacity of at least 100 watts per meter ° Kelvin. Copper alloys have been found to be very suitable.

Since the sleeves have a low heat resistance and the nozzle body has a radius which is reduced by an amount corresponding to the thickness of the sleeve, the heat resistance between the heating coil which is now disposed on the sleeve and the flow passage through the nozzle is very low. Furthermore, the heat generated by the heating coil is uniformly distributed.

Further features and advantages of the present invention will become apparent from the following description of a particular embodiment thereof on the basis of the accompanying drawings.

DESCRIPTION OF PARTICULAR EMBODIMENT

Figure 1:
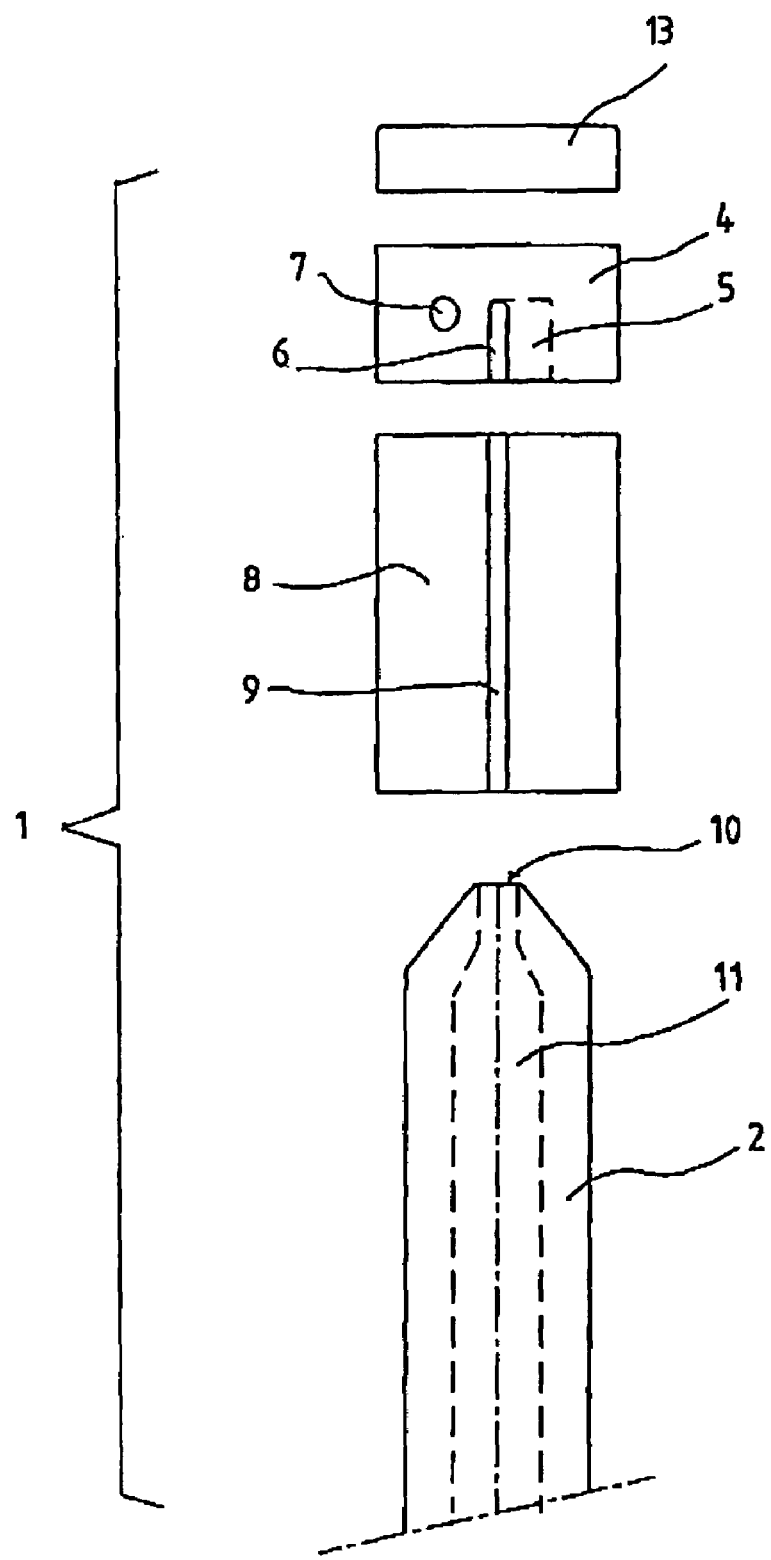
FIG. 1 is an exploded view of an injection molding nozzle according to the invention.

As shown in FIG. 1, an injection nozzle 1 includes a nozzle body 2 with a passage 11 for a melt which extends to a nozzle opening 10. The nozzle body 2 is cylindrical. For simplicity reasons, the end of the nozzle body 2 opposite the nozzle opening 10 is not shown, since this part is conventional.

On the nozzle body 2, a heat conduction sleeve 8 consisting of a copper alloy is disposed which is provided with an axially extending slot 9. The heat conducting sleeve 8 is so designed that it is in tight clamping engagement with the nozzle body 2. The slot 9 of the heat conducting sleeve 8 is so wide that it can accommodate a tube 3 which includes at its front end a thermosensor can be accommodated.

In front of the heat conducting sleeve 8, a clamping sleeve 4 is arranged. The clamping sleeve 4 consists of a copper alloy and is rotatable relative to the heat conducting sleeve 8.

Figure 3:
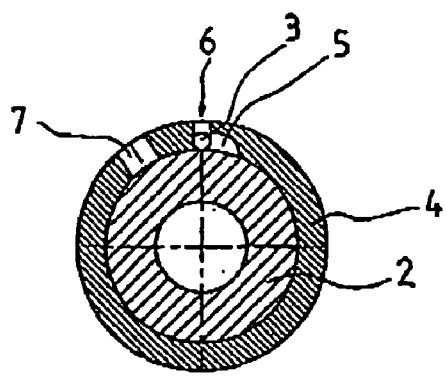
FIG. 3 is a cross-sectional view of the injection molding nozzle taken along line A—A of FIG. 2.
Figure 5:
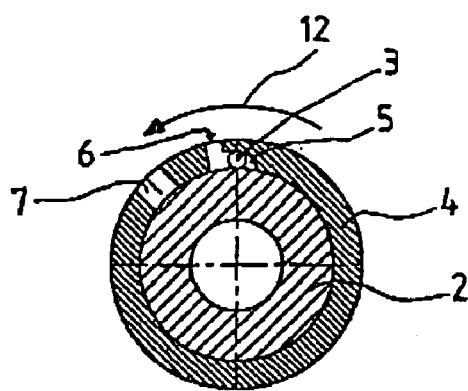
FIG. 5 is a cross-sectional view of the injection molding nozzle taken along line A—A of FIG. 4.

As apparent particularly from FIGS. 3 and 5, the clamping sleeve 4 includes at its interior a cavity 5, which is accessible via a radial opening 6. The cavity 5 and the opening 6 extend to the axial end of the clamping sleeve 4 adjacent the heat conduction sleeve 8. The clamping sleeve 4 has a bore 7 for receiving a projection of a tool for rotating the clamping sleeve 4.

At the front end of the clamping sleeve 4, a locking ring 13 is disposed on the nozzle body by which the clamping sleeve 4 is securely held on the nozzle body 2.

The width of the opening 6 is so selected that the tube 3 in which the temperature sensor is disposed can be accommodated.

As apparent particularly from FIGS. 3 and 5, the radial depth of the cavity 5 becomes smaller in the circumferential direction of the sleeve. At its end remote from the opening 6 the contour of the cavity 5 corresponds about to the contour of the tube 3.

Figure 2:
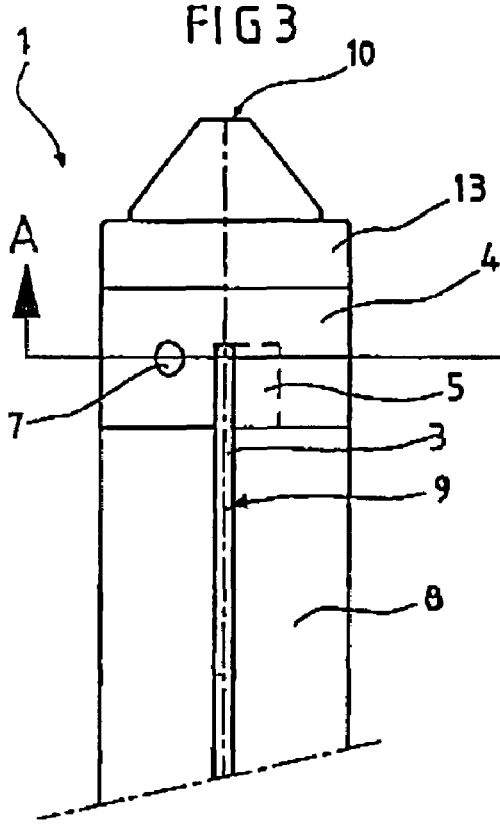
FIG. 2 shows the injection molding nozzle assembled with a temperature sensor disposed in a groove of a sleeve in a position in which the groove is in alignment with an access opening.

In the representations of FIGS. 2 and 3, the clamping sleeve 4 is so arranged on the nozzle body 2 that the opening 6 is in alignment with the slot 9 of the heat conduction sleeve 8. In this position, the straight tube 3 can be inserted into the slot 9 so that it comes into contact with the nozzle body 2.

Figure 4:
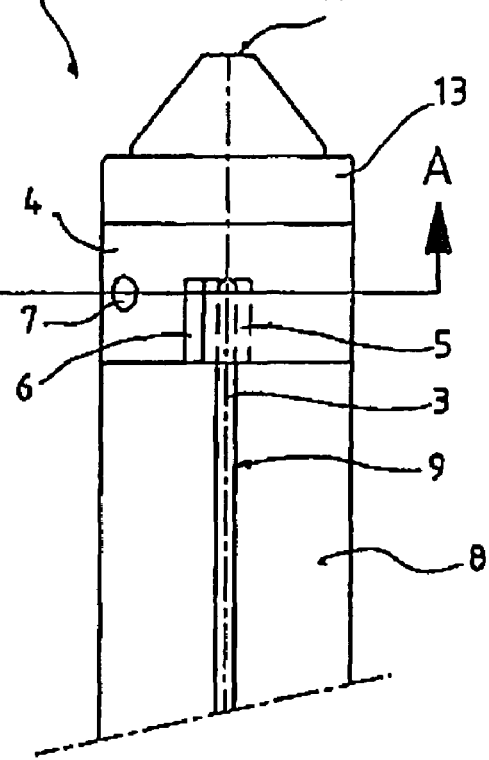
FIG. 4 shows the injection molding nozzle of FIG. 1 assembled with the temperature sensor in a position in which the access opening is not in alignment with the slot in the heat conducting sleeve.

When the tube 3 has been inserted into the opening 6 and into the slot 9, the clamping sleeve 4 is rotated on the nozzle body 2. FIGS. 4 and 5 show the clamping sleeve 4 in the rotated position. The direction of rotation is indicated in FIG. 5 by an arrow 12.

As apparent particularly from FIG. 5, after rotation of the clamping sleeve 4, the tube 3 is disposed in a space delimited by the wall of the cavity 5 and the nozzle body 2. Since the height of the cavity 5 becomes smaller in the circumferential direction of the sleeve, the rotation of the clamping sleeve 5 in the direction of the arrow 12 results in the tube being pressed into firm engagement with the nozzle body 2. This results in a firm mechanical contact so that the heat transfer resistance between the tube 3 and the nozzle body 2 is very small and, particularly, is the same in all the injection molding nozzles.

Figure 6:
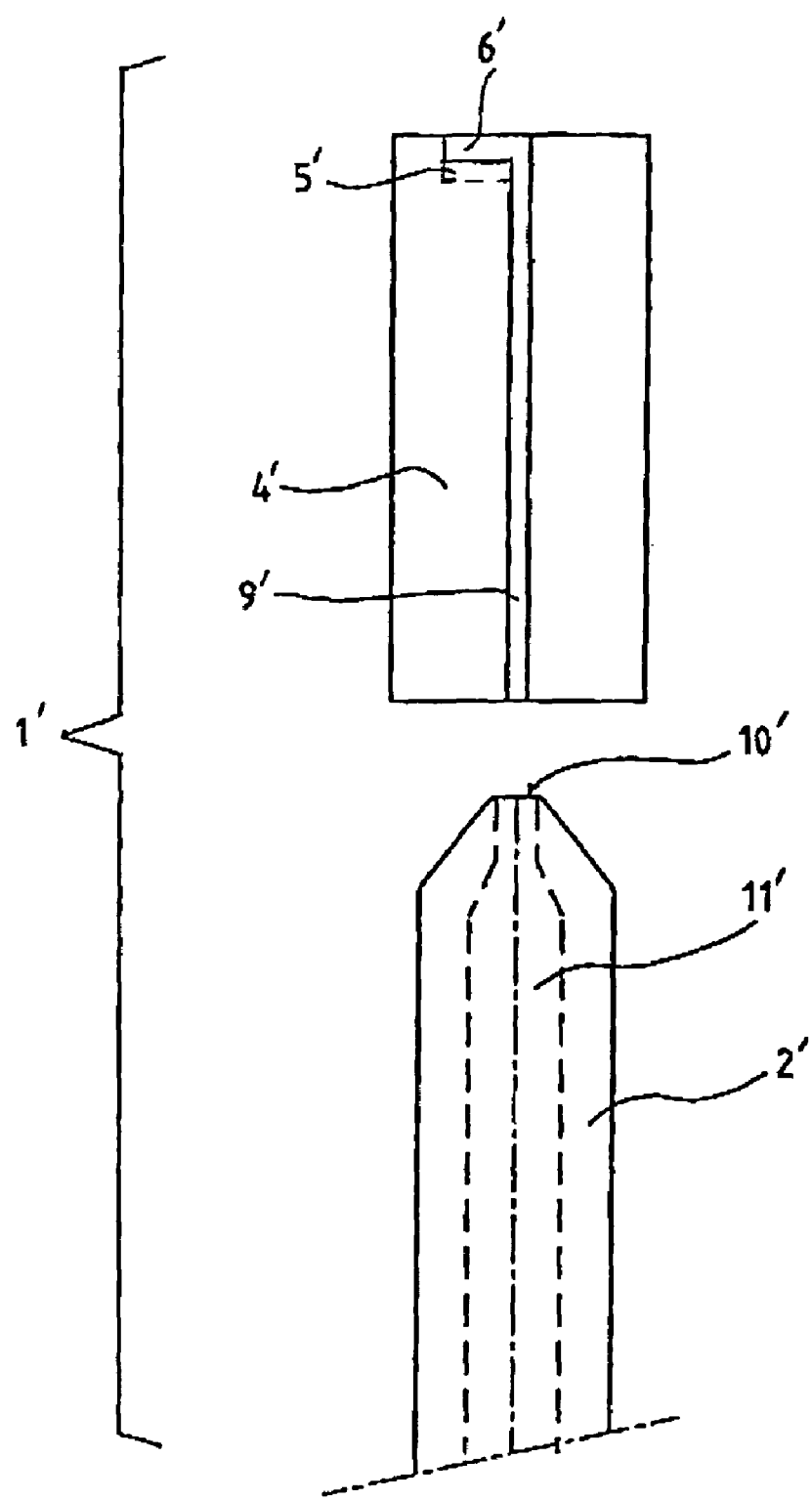
FIG. 6 shows a second embodiment of an injection molding nozzle in an exploded view.
Figure 7:
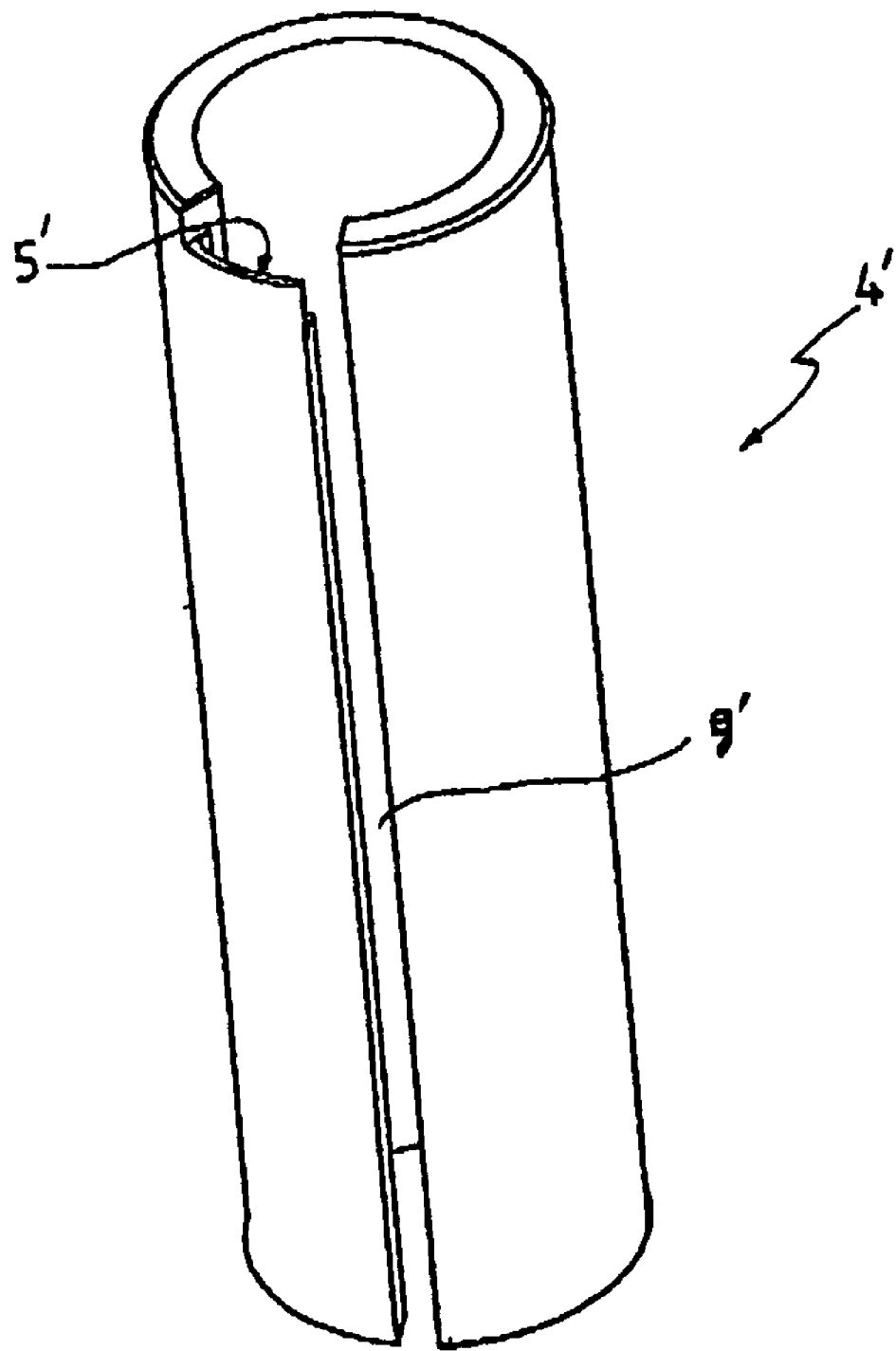
FIG. 7 is a perspective view of the clamping sleeve of FIG. 6.

FIG. 6 shows an injection molding nozzle including a nozzle body 2' with a clamping sleeve 4' of a copper alloy which is disposed on the nozzle body 2' so that it is not rotatable.

The clamping sleeve 4' is provided with a cavity 5' which extends in the circumferential direction of the clamping sleeve 4'. The cavity 5' has an access opening 6' which extends parallel to the cavity 5' and up to the front end of the clamping sleeve 4'. The cavity 5' and the access opening 6' extend circumferentially up to an axial slot 9' of the clamping sleeve 4'. The slot 9' is sufficiently wide so as to accommodate a tube at the front end of which a temperature sensor is arranged. If the end of the tube with the temperature sensor is angled, that is, bent over, the angled end can be disposed in the cavity 5' by axially moving the tube in the slot 5'.

What is claimed is:

1. An injection molding nozzle (1, 1') comprising a nozzle body (2, 2') having a passage (11, 11') with a nozzle opening 910, 10'), a thermoelement (3, 3') disposed on the nozzle body (2, 2') and a clamping sleeve (4, 4') movably disposed on the nozzle body (2, 2') and having at the interior wall thereof a cavity (5, 5') with an access opening (6, 6'), which is sized so as to accommodate the thermoelement (3) and through which the thermoelement can be inserted into the cavity (5, 5'), said cavity having a radially outer wall which is inclined so as to form a ramp on the outer cavity wall of the sleeve whereby, by movement of the clamping sleeve (4, 4') relative to the thermoelement, the thermoelement (3, 3') is biased into firm contact with the nozzle body (2, 2').

2. An injection molding nozzle according to claim 1, wherein the clamping sleeve (4) is rotatably supported on the nozzle body (2).

3. An injection molding nozzle according to claim 1, wherein the cavity (5) and the access opening (6) extend in the clamping sleeve (4) axially up to the end of the clamping sleeve remote from the nozzle opening (10).

4. An injection molding nozzle according to claim 1, wherein the height of the cavity (5) becomes smaller in a circumferential direction of the sleeve with increasing circumferential distance from the access opening (6).

5. An injection molding nozzle according to claim 4, wherein the height of the cavity (5) becomes smaller following a certain curve.

6. An injection molding nozzle according to claim 1, wherein the cavity (5') and the access opening (6') extend in the circumferential direction of the clamping sleeve (4').

7. An injection molding nozzle according to claim 6, wherein the clamping sleeve (4') is provided with an axially extending slot (9').

8. An injection molding nozzle according to claim 1, wherein a heat conductive sleeve (8) is firmly mounted onto the nozzle body (2).

9. An injection molding nozzle according to claim 8, wherein the heat conductive sleeve (8) includes an axially extending slot (9).

10. An injection molding nozzle according to claim 8, wherein at least one of the heat conducting sleeve (8) and the clamping sleeve (4) consists of a material which has a heat conductivity of at least 100 Watts per meter Kelvin.

* * * * *